United States Patent
Nguyen

(10) Patent No.: US 7,923,416 B2
(45) Date of Patent: Apr. 12, 2011

(54) METHOD OF REDUCING THE VISCOSITY OF HYDROCARBON FLUIDS

(75) Inventor: Duy T. Nguyen, Houston, TX (US)

(73) Assignee: Nalco Company, Naperville, IL (US)

( * ) Notice: Subject to any disclaimer, the term of this patent is extended or adjusted under 35 U.S.C. 154(b) by 33 days.

(21) Appl. No.: 12/265,859

(22) Filed: Nov. 6, 2008

(65) Prior Publication Data

US 2010/0113309 A1    May 6, 2010

(51) Int. Cl.
*C09K 8/60* (2006.01)
*E21B 43/00* (2006.01)
*E21B 37/06* (2006.01)
*C09K 8/588* (2006.01)

(52) U.S. Cl. ........ 507/212; 507/214; 507/230; 507/231; 507/261; 166/304

(58) Field of Classification Search ........... 507/212, 507/214, 230, 231, 261; 166/304
See application file for complete search history.

(56) References Cited

U.S. PATENT DOCUMENTS

| 2,582,323 | A | | 2/1948 | Fischer |
| 3,679,582 | A | * | 7/1972 | Wagenaar ........... 507/90 |
| 4,228,277 | A | | 10/1980 | Landoll |
| 4,529,523 | A | | 7/1985 | Landoll |
| 4,744,865 | A | | 5/1988 | Dreisbach et al. |
| 7,041,707 | B2 | | 5/2006 | Hahn |

FOREIGN PATENT DOCUMENTS

| WO | 2005/040669 | 6/2005 |
| WO | WO 2005/040669 A1 | 6/2005 |

* cited by examiner

*Primary Examiner* — Timothy J. Kugel
*Assistant Examiner* — Atnaf Admasu
(74) *Attorney, Agent, or Firm* — Edward O. Yonter; Michael B. Martin

(57) ABSTRACT

This invention relates to methods for reducing the viscosity of hydrocarbon liquids encountered in petroleum operations. The method includes forming a low viscosity emulsion by contacting hydrocarbon liquids with an effective amount of a water-soluble polymer having pendant methyl ether groups.

16 Claims, No Drawings

METHOD OF REDUCING THE VISCOSITY OF HYDROCARBON FLUIDS

TECHNICAL FIELD

This invention relates generally to methods of preparing low-viscosity oil in water emulsions from viscous hydrocarbon fluids encountered in petroleum operations. More specifically, the invention relates to methods of enhancing the recovery and transport of heavy petroleum oils. The invention has particular relevance to contacting hydrocarbon fluids encountered in petroleum operations with a water-soluble polymer having pendant methyl ether groups to create oil in water emulsions thereby reducing the viscosity of the hydrocarbons to increase transport efficiency.

BACKGROUND

Transport of viscous fluids along pipeline for delivery to a refinery or other storage facility presents a myriad of challenges. One major challenge is recovering and transporting high viscosity petroleum products from well sites to refineries or storage facilities. In many known petroleum-containing sites, very little petroleum may be obtained by known means because of the high viscosity of the petroleum products.

Various techniques are known for aiding in the recovery of viscous petroleum and facilitating its transport to a refinery, storage site, or other location. These techniques include, for example, mechanical pumping, mechanical pumping combined with steam injection, and mining. Pumping unit limitations have a negative impact on the economics of producing viscous oil found in many parts of the world from pumped wells. The high viscosity of these crude oils results in low pump volumetric efficiency and high flow rate pressure drop. When extracted from the well, the viscous oil must be transported from the field to a refinery or shipping terminals.

Heavy oils exhibit a viscosity generally from 10,000 to 500,000 cP at room temperature. As a result, according to current practice pumping and heating stations are used to maintain a low viscosity for transport along pipelines. However, prolonged pumping interruptions often occur resulting in cold crude oil with concomitant plugging of pipes and pumps. Insulating hundred of miles of pipe is usually cost prohibitive. Heating the crude oil likewise consumes a large amount of energy and is cost ineffective. Diluents (e.g., fuel oil or kerosene) are sometimes used to reduce viscosity for pumping and transport. However, the large amount of diluent required is not readily available in the production area and, furthermore, the diluent would have to be recovered at the pipe end and pumped back to the field over great distances.

There thus exists an ongoing need for improved methods to decrease the viscosity of hydrocarbons to improve pump performance and operating efficiency thereby enhancing production. There exists a specific need for enhancing recovery and transport of viscous and extremely viscous petroleum such as that found in heavy oil reservoirs and other deposits.

SUMMARY

This invention accordingly relates to improved methods of reducing the viscosity of hydrocarbon fluids encountered in petroleum operations to facilitate the flow of such fluids between two locations. In a preferred aspect, the invention relates to reducing the viscosity of petroleum products, such as heavy oil and crude oils, to facilitate its transport between the site of recovery (e.g., oil well) and a refinery or storage facility. In a preferred aspect, the present invention is a method for the preparation of low-viscosity oil in water emulsions from viscous oils. These emulsions, in turn, will increase the oil production and provide a cost-effective alternative to heated pipelines or diluents for transportation of heavy oil.

In an aspect, the invention relates to a method of reducing the viscosity of hydrocarbon fluids encountered in petroleum operations. The method includes contacting the hydrocarbon fluid with one or more of the described polymers to facilitate transport of the fluid along a fluid flow path to a refinery or other storage site. Preferably, the invention relates to an enhanced process for reducing the viscosity of hydrocarbons such as heavy oil and crude oils. The present invention involves contacting the polymers herein described with a hydrocarbon fluid to convert the hydrocarbon fluid from high viscosity oil or water-in-oil emulsions to low viscosity oil-in-water emulsions, resulting in increased productivity.

It is an advantage of the invention to provide a novel method of reducing the viscosity of hydrocarbon fluids encountered in petroleum operations to facilitate transfer of such fluids to refineries or other storage sites.

It is another advantage of the invention to provide a method forming oil in water emulsions by contacting a water-soluble polymer having pendant methyl ether groups with hydrocarbon fluids encountered in petroleum operations thereby reducing the viscosity of the hydrocarbon fluids and increasing transport efficiency.

An additional advantage of the invention is to provide a novel method that obviates the need for diluents and heated pipelines in the transport of hydrocarbon fluids encountered in petroleum operations.

Another advantage of the invention is to provide methods of reducing the viscosity of hydrocarbon fluids encountered in petroleum operations that are able to function with lower foaming than prior art surfactants and that are immune to the salinity levels of the water in the system.

It is a further advantage of the invention to provide methods improving the efficiency of recovering oil from oil in water emulsions after transport.

Additional features and advantages are described herein, and will be apparent from, the following Detailed Description and Examples

DETAILED DESCRIPTION

The present invention includes enhanced methods of reducing the viscosity of hydrocarbon fluids encountered in petroleum operations by contacting such fluids with an effective amount of a polymer having methyl ether groups pendant to the backbone of the polymer. The term "pendant to the backbone," refers to methyl ether groups attached to the main polymer chain through the oxygen of the methyl ether groups. Polymers used in the method of the invention are preferably water-soluble.

Petroleum operations as used herein refer to any primary, secondary, and tertiary oil recovery system. The method of the invention may be employed by contacting the described polymers with or adding the polymers to the hydrocarbon fluids in a manner known per se. In a preferred method of this invention, the polymers of the invention are added at any point in the flow line upflow from the point at which reduced viscosity is desired.

An exemplary technique in primary oil recovery where the method of the invention may employed is the squeeze treating technique, whereby the polymers are injected under pressure into the producing formation, are adsorbed on the strata, and desorbed as the fluids are produced. They can further be added in the water flooding operations of secondary oil recovery as well as be added to pipelines, transmission lines, and refinery units.

Preferred polymers for use in the method of the invention are disclosed in U.S. Pat. No. 4,744,865, titled "Process for Controlling Pitch Deposition from Pulp in Papermaking Systems." The description of those polymers is incorporated herein by reference in its entirety. The preferred polymers have methyl ether groups pendant to the backbone of the polymer. Exemplary polymers include water-soluble homopolymers of methyl vinyl ether and water-soluble copolymers derived from polymerizing methyl vinyl ether with nonionic hydrophilic monomers, anionic hydrophilic monomers, and/or hydrophobic monomers. Such copolymers preferably have at least 20 mol percent of methyl vinyl ether.

In a preferred embodiment, the polymers used in the method of the invention have a molecular weight from about 5,000 to about 150,000. In one embodiment, the polymers for the method of this invention are derived or synthesized by polymerizing methyl vinyl ether either alone to form a homopolymer. In another embodiment, the polymers are derived or synthesized in combination with one or more nonionic hydrophilic, anionic hydrophilic, and/or hydrophobic monomers to form a copolymer having at least 20 mol percent of methyl vinyl ether.

According to an embodiment, the polymers of the instant invention are water-soluble homopolymers of methyl vinyl ether. The polymers may also be water-soluble copolymers derived from polymerizing methyl vinyl ether with hydrophobic monomers to form having at least 20 mol percent methyl vinyl ether. Preferably, such copolymers have from about 0 mol percent to about 50 mol percent of recurring hydrophobic units. It is also preferred that the hydrophobic units of the copolymer are derived from monomers having from 2 to about 25 carbons. Representative hydrophobic monomers, which may be effective when used in the method of the invention, include vinyl acetate, propylene oxide, methacrylate, methyl ethacrylate, octadecylacrylate, n-octadecylacrylamide, styrene, methyl styrene, allyl stearate, vinyl stearate, ethene, propene, n-butene, isobutene, pentene, dodecene, octadecene, and vinyl ethers higher than methyl.

The polymers of this invention may also be water-soluble copolymers having at least 20 mol percent of methyl vinyl ether derived from methyl vinyl ether with nonionic hydrophilic monomers and/or anionic hydrophilic monomers. The polymer can have from about 0 mol percent to about 80 mol percent of recurring hydrophilic units. Preferably, methyl vinyl ether is present in the copolymer at greater than about 30 mol percent. Exemplary nonionic hydrophilic monomers effective in the method of the invention include vinyl pyrolidone, ethylene oxide, and acrylamide. Representative anionic hydrophilic monomers include maleic anhydride, acrylic acid, methacrylic acid, maleic acid, itaconic acid, acrylamido acid, maleamic acid, and styrenesulfonic acid It should be appreciated that effective copolymers for use in the method of this invention can be formed having random distribution of the monomers or various degrees of block formation and/or alternation within the polymer. The term "block formation," refers to those copolymers with monomeric units of the same type tending to form regions in the polymer in exclusion of the other monomer The term "alternation," refers to those copolymers where every other monomeric unit in the polymer (or a region of the polymer) is the same.

In a further embodiment, the polymers employed in the method of this invention are water-soluble polymers derived by substituting methyl ether groups onto a preformed or pre-existing polymer having available reactive groups (collectively referred to as "reactive polymer"). The water-soluble polymer typically has from about 20% to about 100% of the available reactive groups of the reactive polymer substituted with methyl ether groups. Such reactive polymers are of either synthetic or natural origin that may be reacted to add methyl ether groups to its structure via methods known to those skilled in the art. Examples of suitable reactive polymers include polyvinyl alcohol, polyvinyl acetate, cellulose, and various carbohydrates such as starch, galactomannan, galactoglucomannan, xylan, arabinogalactan, and chitan. "Available reactive groups" refers to any group on a reactive polymer that may be used to incorporate methyl ether groups into the polymer via reaction mechanisms known to those skilled in the art.

In alternative embodiments, the available reactive groups of the reactive polymer can be substituted with other hydrophilic and/or hydrophobic groups, which allows for water solubility of the polymer. The polymer can be derived by substituting hydrophobic groups along with the methyl ether groups onto a suitable reactive polymer to form a water-soluble polymer having from about 0 mol percent to about 50 mol percent of the available reactive groups substituted with hydrophobic groups. Preferably, the hydrophobic groups have from 2 to about 25 carbons and are linked to the polymer by ether, ester, amine, amide, carbon-carbon, or other suitable bond types.

Representative preferred hydrophobic groups include hydroxypropyl hydroxybutyl, acetate, and ethers and esters having 2 to 16 carbons. The polymer can be similarly derived by substituting hydrophilic groups along with the methyl ether groups onto a suitable reactive polymer to form a water-soluble polymer having from about 0 mol percent to about 80 mol percent of the available reactive groups substituted with hydrophilic groups. Preferred hydrophilic groups include hydroxyl, carboxyl, sulfonic, pyrolidone, ethoxy, amide, and polyethylene oxy groups. Moreover, it is further believed that the polymers of this invention having methyl ether groups pendant to the backbone may have both hydrophobic and hydrophilic substitutions in the same polymer and still be effective for reducing the viscosity of hydrocarbon fluids found in petroleum operations. Examples of such polymers include hydroxybutyl methyl celluloses and hydroxypropyl methyl celluloses.

Preferably the water-soluble polymer is a cellulose ether. The cellulose ether is preferably one of the following: methylcellulose, methyl hydroxyethyl cellulose, methyl hydroxypropyl cellulose, carboxymethyl methylcellulose, and methyl hydroxybutyl methylcellulose. It is preferred that the polymer is a methylcellulose having a degree of substitution from 1.5 to 2.4. The term "degree of substitution" means that on average for the polymer, 1.5 to 2.4 of the 3.0 available reactive hydroxyl groups of the anhydroglucose units of the cellulose are modified to methyl ether groups. Most preferably, the methylcellulose polymer has a molecular weight from about 5,000 to about 150,000. The methylcellulose polymer can also have hydroxyethyl, hydroxypropyl, carboxymethyl, and/or hydroxybutyl groups in addition to methyl ether and hydroxyl groups.

The effective viscosity-reducing amount of the water-soluble polymers of the invention varies with the system in which the polymer is being used and the particular polymer. Methods for monitoring the viscosity of the hydrocarbon fluids in different systems are well known, and may be used to decide the effective amount required in a particular situation. Typical effective doses of the described water-soluble polymers range from about 100 ppm to about 7%. A more preferred range is from about 300 ppm to about 4%. Them most preferred dosage range is from about 500 ppm to about 2%. These values are given as polymer actives based upon the total volume of the emulsion.

In certain instances, the described polymers may also be formulated with other materials commonly used for treating hydrocarbon fluids and oil in water emulsion encountered in petroleum operations. Such other materials include, but are not limited to corrosion inhibitors, scale inhibitors, surfactants, other treatment formulations, combinations, and the like.

The viscosity of the hydrocarbon fluid after contact with the water-soluble polymer of the invention is preferably below 5,000 cP at 25° C.

The foregoing may be better understood by reference to the following examples, which are intended only for illustrative purposes and are not intended to limit the scope of the invention.

In the following examples, heavy oil was mixed with an aqueous solution containing a predetermined amount of the indicated treating composition. Mixing was accomplished by blending the heavy oil and the composition under agitation for 30 seconds (small blender) or 5 minutes (overhead stirrer). The emulsions were then transferred to a funnel with a small opening and the time to drain was recorded. Faster drainage time translates into a more effective treatment.

EXAMPLE 1

Table 1 compares time to drain (an indicator of viscosity reduction) for mixtures of 70 vol % heavy oil and 30 vol % water (mixed with a small blender) with the indicated emulsifier. The anionic surfactant used was similar to that disclosed in U.S. Pat. No. 7,041,707 B2, titled "Polyether Polyesters Having Anionic Functionality." Commercial A and B (and Commercial C in Table 2) are commonly used viscosity reducers comprised of polyvinyl alcohol (as disclosed in WO 2005/040669 A1). It can be seen that Hydroxylpropyl methylcellulose A and B are comparable or superior in performance to Commercial A and Methylcellulose is superior to Commercial B.

TABLE 1

| Treatment | Dosage (ppm actives) | Time to drain |
|---|---|---|
| Untreated | 0 | >15 min |
| Anionic surfactant | 1,000 | >3 min |
| Commercial A | 1,000 | 22 sec |
| Commercial B | 1,000 | >3 min |
| Methylcellulose | 1,000 | 2 min |
| Hydroxylpropyl methylcellulose A | 1,000 | 40 sec |
| Hydroxylpropyl methylcellulose B | 1,000 | 18 sec |
| Nonyl phenol ethoxylates | 1,000 | >5 min |

EXAMPLE 2

Tables 2 and 3 compare time to drain for various mixtures of heavy oil and water with the indicated emulsifier (i.e., viscosity-reducing polymer) of the invention. Table 2 compares mixtures of 70 vol % heavy oil and 30 vol % water (mixed with an overhead stirrer) with the indicated emulsifier. Table 3 compares the performance of the indicated chemistries in a mixture of 80% heavy oil and 20% water (mixed with an overhead stirrer) with the indicated emulsifier. The dosage of the emulsifier is given as a vol % based on water content of the emulsion.

In Table 3, the MA copolymer was a maleic acid copolymer; the phosphate ester was ethoxylated C12 alcohol phosphate; AKD A and B were alkyldiphenyloxide disulfonates; and DMA-EPI-NH$_3$ and DMA-EPI were dimethyl amine epichlorohydrin copolymers (with and without added ammonia).

TABLE 2

70/30 Mixtures of Heavy Oil and Water

| Treatment | Dosage | Time to drain |
|---|---|---|
| Commercial A | 0.06 | 10 sec |
| Commercial A | 0.12 | 12 sec |
| Commercial B | 0.06 | 15 sec |
| Commercial B | 0.12 | >3 min |
| Commercial C | 0.06 | 11 sec |
| Commercial C | 0.12 | 15 sec |
| Hydroxylpropyl methylcellulose A | 0.06 | 12 sec |
| Hydroxylpropyl methylcellulose A | 0.12 | 18 sec |
| Hydroxylpropyl methylcellulose B | 0.06 | 12 sec |
| Hydroxylpropyl methylcellulose B | 0.12 | 9 sec |
| Hydroxylpropyl methylcellulose C | 0.06 | 13 sec |
| Hydroxylpropyl methylcellulose C | 0.12 | 13 sec |

TABLE 3

80/20 Mixtures of Heavy Oil and Water

| Treatment | Dosage | Time to drain |
|---|---|---|
| Commercial C | 0.01 | >60 sec |
| Commercial C | 0.02 | 14 sec |
| Commercial C | 0.04 | 8 sec |
| Commercial C | 0.06 | 17 sec |
| Imidazoline | 0.04 | >2 min |
| MA copolymer | 0.04 | >2 min |
| Phosphate ester | 0.04 | >2 min |
| AKD A | 0.04 | >2 min |
| AKD B | 0.04 | >2 min |
| DMA-EPI-NH$_3$ | 0.04 | >2 min |
| DMA-EPI | 0.04 | >2 min |
| Hydroxylpropyl methylcellulose B | 0.01 | 50 sec |
| Hydroxylpropyl methylcellulose B | 0.02 | 9 sec |
| Hydroxylpropyl methylcellulose B | 0.04 | 11 sec |
| Hydroxylpropyl methylcellulose B | 0.06 | 14 sec |

EXAMPLE 3

The polymer of the present invention may be dissolved in water (e.g., tap water, distilled water, sea water, surface water, potable water, or any other available water) from about 0.2 wt % to about 8 wt %. The prepared treatment formulation may then be added to, for example, the annulus of a well such that the ratio of the wt % of the treatment formulation to the wt % of the viscous oil with which it is brought into contact is in the range of about 0.1 to about 1.5.

It should be understood that various changes and modifications to the presently preferred embodiments described The claimed invention is:

1. A method for reducing the viscosity of a hydrocarbon fluid encountered in petroleum operations, the method comprising: contacting said hydrocarbon fluid with an effective amount of a water-soluble polymer to form an emulsion, said polymer having pendant methyl ether groups.

2. The method of claim 1, wherein the water-soluble polymer is derived by substituting methyl ether groups onto a preformed reactive polymer, said preformed reactive polymer being a vinyl alcohol polymer and said water-soluble polymer having from about 20% to about 100% of available reactive groups of the preformed reactive polymer substituted with methyl ether groups.

3. The method of claim 2, wherein the preformed reactive polymer is selected from the group consisting of: polyvinyl alcohol, polyvinyl acetate, cellulose, starch, galactomannan, galactoglucomannan, xylan, arabinogalactan, chitan, and combinations thereof.

4. The method of claim 1, wherein the water-soluble polymer is derived by substituting methyl ether groups onto a preformed reactive polymer, and the water-soluble polymer having from about 20% to about 100% of available reactive groups of the preformed reactive polymer substituted with methyl ether groups.

5. The method of claim 1, wherein the water-soluble polymer further has up to about 80 mol percent of the available reactive groups substituted with hydrophilic groups other than polyvinyl alcohol.

6. The method of claim 1, wherein the water-soluble polymer has up to about 50 mol percent of the available reactive groups substituted with hydrophobic groups.

7. The method of claim 6, wherein the hydrophobic groups have from 2 to about 25 carbons.

8. The method of claim 6, wherein the hydrophobic groups are selected from the group consisting of: vinyl acetate; propylene oxide; methacrylate; methyl ethacrylate; octadecylacrylate; n-octadecylacrylamide; styrene; methyl styrene; allyl stearate; vinyl stearate; ethene; propene; n-butene; isobutene; pentene; dodecene; octadecene; vinyl ethers higher than methyl; and combinations thereof.

9. The method of claim 1, wherein the water-soluble polymer is a cellulose ether.

10. The method of claim 9, wherein the cellulose ether is selected from the group consisting of: methylcellulose; methyl hydroxyethyl cellulose; methyl hydroxypropyl cellulose; carboxymethyl methylcellulose; methyl hydroxybutyl methylcellulose; and combinations thereof.

11. The method of claim 9, wherein the cellulose ether is a methylcellulose having a degree of substitution from 1.5 to 2.4.

12. The method of claim 9, wherein the cellulose ether has a molecular weight from about 5,000 to about 150,000.

13. The method of claim 9, wherein the cellulose ether has pendant groups selected from the group consisting of: hydroxyethyl; hydroxypropyl; carboxymethyl; hydroxybutyl; hydroxyl; and combinations thereof.

14. The method of claim 1, wherein the effective amount of the water-soluble polymer is from about 100 ppm to about 7%, as polymer actives based upon total volume of the emulsion.

15. The method of claim 1, wherein the effective amount of the water-soluble polymer is from about 300 ppm to about 4%, as polymer actives based upon total volume of the emulsion.

16. The method of claim 1, wherein the effective amount of the water-soluble polymer is from about 500 ppm to about 2%, as polymer actives based upon total volume of the emulsion.

* * * * *